Dec. 19, 1967    NOBORU MARUYAMA    3,358,651
BOILER AND AN ORDINARY TYPE HOT WATER DEVICE IN
ACCORDANCE WITH A COMBUSTION METHOD UTILIZING
COOLING COMBUSTION METHOD OF COMBUSTION GAS
IN ADDITION TO UNIFORM HEAT
DISTRIBUTION METHOD
Filed May 16, 1966
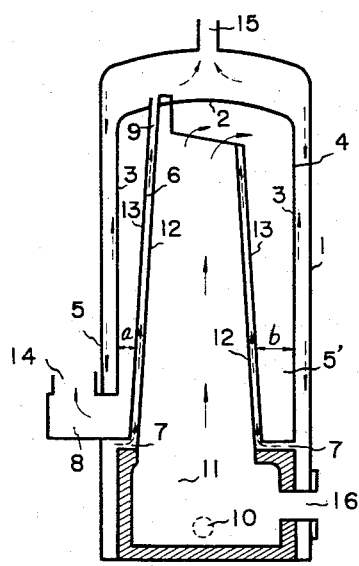
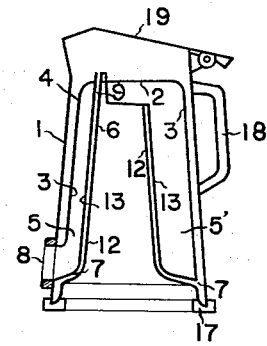
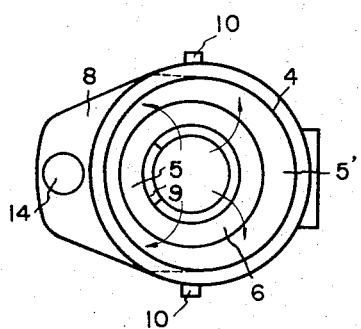
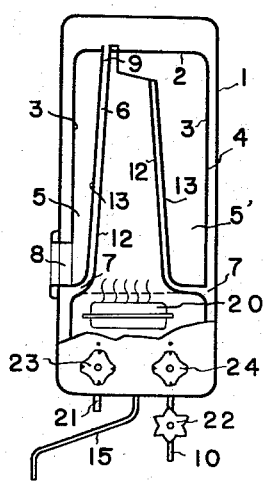
INVENTOR.
Noboru Maruyama
BY
Attorney under United States Patent Office 3,358,651
Patented Dec. 19, 1967

3,358,651
BOILER AND AN ORDINARY TYPE HOT WATER DEVICE IN ACCORDANCE WITH A COMBUSTION METHOD UTILIZING COOLING COMBUSTION METHOD OF COMBUSTION GAS IN ADDITION TO UNIFORM HEAT DISTRIBUTION METHOD
Noboru Maruyama, 187–1, Oaza-Nagisa, Matsumoto-shi, Nagano-ken, Japan
Filed May 16, 1966, Ser. No. 550,354
6 Claims. (Cl. 122—160)

ABSTRACT OF THE DISCLOSURE

A vapor generator comprising a vertically oriented shell and a heat-absorbing body having inwardly depressed concave shape disposed within and spaced from the main body and defining a fluid region therebetween including a vertically elongated peripheral fluid region portion. An inner cylinder is disposed within the heat-absorbing body and defines an interior heating gas chamber therein, as well as a substantially annular heating gas space thereabout between the inner cylinder and the heat-absorbing body. The inner cylinder defines an opening at the top thereof communicating the interior heating gas chamber with the substantially annular heating gas space. The inner cylinder includes a conduit extending therealong and communicating at the top thereof with the fluid region and means are provided for passing a vaporizable fluid into the conduit and means are provided for passing a heating gas into the interior heating gas chamber at the bottom of the heating gas chamber. A flue gas conduit exit communicating with the vertically elongated peripheral fluid region portion is provided for removing the heating gas therefrom and is disposed at the bottom thereof, and the inner cylinder is oriented within the heat-absorbing body closer to the heat-absorbing body adjacent the flue gas conduit exit than at portions remote from the flue gas conduit exit.

The present invention relates to a boiler in general, and to a type of hot water device heated by combustion gas, and utilizing a special cooling of the combustion gas in addition to providing a uniform heat distribution, in particular. The method of combustion utilized in the present invention is based on combustion in which convection of the combustion gas within a chamber is most efficiently utilized and the theory on which the method is based is quite different from conventional combustion which is currently utilized by means of an upward movement of the heating or combustion gas (the upward movement which is caused in direct proportion to the diameter of the chimney or stack, the height thereof and the temperature).

It is an object of the present invention to provide a boiler using a combustion method residing in a heat absorption effected by causing an extreme temperature difference between the spaces defined by the outer and inner walls of the unit and by causing the boiler body to absorb heat rapidly; and causing a convection phenomenon of heated combustion gas in direct proportion to the magnitude of the temperature difference so that the supply of air and the discharge of carbon dioxide may be greatly facilitated, whereby the heat of the combustion gas can be uniformly absorbed into the boiler body.

The combustion method of the present invention has revolutionized the conventional combustion method which heretofore utilizes an upward movement of heated combustion gas, and the present invention improves revolutionally the conventional combustion method so that combustion and efficiency of heat absorption may be increased to the maximum degree. The combustion principle of the present invention is a special cooling of the combustion gas which obtains the maximum output power rapidly with a minimum fuel consumption quantity and with the smallest unit possible.

The combustion device of the present invention is constituted, as stated above, from the view-point that the maximum heat value of combustion may be absorbed when combustion is carried out under optimum conditions, and that the convection phenomenon of heating gas, due to physical change, is most effectively utilized, in addition to a uniform heat distribution by the device therefor.

The combustion device of the present invention has such features that almost all of the heating gas arising from combustion and initially moving upwardly may be rapidly absorbed and cooled within an inner cylinder portion and the upper portion of the boiler body by specific heat absorption by means of the boiler body outer cylinder provided in a concave form within the main body whereby a large temperature difference can be produced between the heating gas introduced into the peripheral outer cylinder space or gap and the heating gas within the inner cylinder portion. Thus, the heating gas introduced into the outer cylinder gap or space becomes substantially cooler and heavier compared with the heating gas within the inner cylinder portion so that the heating gas descends by itself and simultaneously the convection velocity is greatly increased.

Accordingly, the larger the temperature difference (that is the heat absorption by the inner cylinder portion), the heavier the heating gas and the faster the convection velocity thereof. For example, assume that the temperature of the combustion heat is 1000° C. and is 50% absorbed by the inner cylinder portion. Then the temperature of the heating gas in the outer cylinder gap or space may be 500° C. so that this heating gas may have the weight and the convection velocity that corresponds to twice as large a temperature difference than that in the inner cylinder portion.

Since the device of the present invention is constructed so that heating absorption may be effected while the heating gas is descending in the outer cylinder gap or space so as to pass through the boiler body uniformly and in every corner thereof to the flue, the heating gas will increase its weight and its convection velocity. For example, assume that the heating gas temperature is lowered by 400° C. while the heating gas is passing downwardly uniformly through the outer cylinder gap or space to the flue. Then the heating gas at the flue will become 100° C. so that this heating gas may have the weight that corresponds to a 10 times larger temperature difference than that within the inner cylinder portion, and the convection velocity will be also increased so much that the convection of the heating gas within the boiler may be facilitated more.

Thus in the combustion device according to the present invention, the greater the absorption factor within the boiler body is increased, the greater the convection of heating gas will be facilitated in direct proportion, so that the discharge of carbon dioxide gas and the supply of air may be improved, whereby complete combustion can be effected. Thus, the combustion device of the present invention has revolutionized or reformed the conventional heat utilization methods fundamentally.

The reason is that the conventional heat utilizing methods largely depend upon the upward movement of the high temperature products of combustion. Furthermore, the supply of air is facilitated by purposely freeing about 60% of combustion heat in order to effect the complete combustion. Heat loss in such methods is extremely large, and for the purpose of eliminating such large heat loss when thermal resistance is made large in order to improve the absorption factor of heat, the incomplete combustion may be produced with a resultant lowering of the combustion temperature is contrary to the purpose of improving the heat absorption.

However, according to the present invention, the drawbacks in the conventional methods are completely eliminated and the greater the heat absorbed (which is the ultimate object), the greater the discharge of carbon dioxide, and the supply of air may be facilitated so that the degree of heat may be increased to its maximum and a surprising high thermal efficiency may be obtained. Additionally, the combustion unit of the present invention requires no chimney or stack.

With these and other objects in view which will become apparent in the following detailed description, the present invention will be clearly understood in connection with the accompanying drawings, in which:

FIGURE 1 is a longitudinal sectional view of a boiler in accordance with the present invention;

FIG. 2 is a horizontal sectional view of FIG. 1;

FIG. 3 is a longitudinal sectional view of a hot water device to which the present invention is applied; and FIG. 4 is a longitudinal sectional view of an instant hot water boiler to which the present invention is applied.

Referring now to the drawing, and more particularly to FIGS. 1 and 2, a heat-absorbing body (outer cylinder) 4 having an upper heat-absorbing surface portion 2 and an inner side heat-absorbing portion 3 is located within a main body or shell 1 of a boiler the heat-absorbing body 4 being in the form of a concave shape. Within the heat-absorbing body 4 is located an inner body or cylinder 6 in the form of a truncated cone defining a peripherial heating gas space or gap 5, 5' around the outer periphery thereof having the distances $a < b$, and through this space or gap heating gas descends after passing from an interior heating gas chamber in the interior of the inner cylinder 6. At the outer end or periphery is connected one end of a convection cooling water communicating member or conduit 7, the other end of which is connected to the lower portion of the inner side heat-absorbing portion 3 of the heat-absorbing body 4. Further, a convection coupling portion 9 is provided at the upper portion and on the flue side of the inner cylinder 6 and is connected to one portion of the upper heat-absorbing surface portion 2 of the heat-absorbing body 4.

At a portion of the outer lower periphery of the main body or shell 1 are provided water feeding and discharging pipes 10. Cooling water is introduced into the inner cylinder 6 from the cooling water communicating member 7 and then flows into the upper portion of the fluid region between the main body 1 and the heat absorbing body 4 through the convection coupling member 9 so that the inner cylinder 6 may be cooled.

A suitable heating device is provided within a combustion chamber 11 formed at the lower portion of the interior heating gas chamber within the inner cylinder 6, and heating gas arising from the heating device is applied to an inner side heat-absorbing surface portion 12 and to the upper heat-absorbing surface portion 2 of the heat-absorbing body 4 so as to conduct heat thereto. By this heat conduction, there will be produced a temperature difference and the heating gas which has become heavier is caused to flow into the peripheral heating gas space 5, 5'. Such heating gas flows down while it is transferring heat to the inner side heat-absorbing surface portion 3 of the heat-absorbing body 4 and to an outer side heat-absorbing surface portion 13 of the inner cylinder 6, and the heating gas is gathered at a flue gas exit or exhaust 8 so as to be discharged from a flue passage 14 into the surrounding atmosphere. The center of the inner cylinder 6 is suitably eccentrically oriented away from the center of the heat-absorbing body 4 toward the flue gas exit 8 so that the space 5 on the side toward the exit 8 is narrower than the opposite side space 5. Thus the heating gas which has become heavier due to the temperature differences may uniformly flow down along every corner of both side spaces 5 and 5' so that this region may be uniformly heated, whereby heat absorption can be increased to its maximum degree.

Since the upper portion on the side of the flue gas exit 8 of the inner cylinder 6 communicates with the upper heat-absorbing surface portion 2 by means of the convection coupling portion 9, the heated hot water within the inner cylinder 6 by heat absorption can rapidly move upwardly without any resistance so that the convection of hot water within the boiler body may be greatly improved. As described above, the heat-absorbing body 4 is located within the boiler main body 1 and the inner cylinder 6 is located suitably eccentrically of the center of the heat-absorbing body 4 toward the flue gas exit 8 so that uniform conduction of heat and the convection downward motion may be effected by introducing cool water into the inner cylinder 6 so as to cool the heating gas. Therefore, fuel consumption is substantially reduced and hot water or heated steam at a desired temperature may be rapidly and easily obtained. Such hot water or heated steam may be furnished from a hot water faucet 15 provided at the upper portion of the main body 1. Further, a fire hole 16 is provided, communicating with the combustion chamber 11.

The inner cylinder 6 and the outer cylinder, or the inner cylinder 6 alone may be constituted by a pipe having a helical or other shape. In this case, a covering tube or cylinder is mounted on the outer surface of the inner cylinder so that the downward movement of heat may be improved or suitably regulated. Further, in order to increase the heating face or surfaces of the heat-absorbing body and/or the inner cylinder, walls or pipes are provided or the surface or surfaces are corrugated. With such a construction, thermal efficiency and other features will be substantially improved compared with the above described type construction.

The above description has been made primarily with reference to an embodiment of the present invention applied to the boiler. However, the present invention is not limited to a boiler in its application, but the present invention can be applied to any hot water boiler device with highly improved effects. Referring now again to the drawing and more particularly to FIG. 3, the present invention is illustrated as being applied to a hot water device including seats 17, a handle 18 and a cap or lid 19. FIG. 4 illustrates the present invention as aplied to an instant hot water boiler including a heating device 20 utilizing gas or petroleum as a fuel, a fuel supply pipe 21, a water supply valve 22, an igniting and hot water furnishing valve 23 and a regulating valve 24.

The embodiments of FIGS. 3 and 4 require no further description because their combustion principles, construction and the effects thereof are similar to the boiler which has been described in detail with identical numerals indicating like functions and construction in the several figures.

Further, when the present invention is applied in a boiler or any hot water device and if the flue for heating gas (carbon dioxide) is to be provided all around the unit, it complies with the invention to locate the inner and outer cylinders concentrically from the principle of uniform heat distribution.

As is apparent from the above description of the embodiments of the present invention, the present invention utilizes in a most efficient manner the characteristic that the convection phenomenon of heating gas within a boiler body may be greatly improved by heat absorption, in addition to the adoption of a unique combustion method by which the boiler body is uniformly distributed so as to be heated, so that the discharge of carbon dioxide and the supply of air which is necessary for combustion may be simultaneously and rationally effected, whereby complete combustion and a high thermal efficiency are obtained. Therefore, hot water or steam at a desired temperature may be rapidly obtained and fuel consumption therefore can be substantially reduced. Further, the present invention is very simple in construction so that the manufacture thereof is simplified and cleaning the device may be easily accomplished.

While I have disclosed several embodiments of the present invention it is to be understood that these embodiments are given by example only and not in a limiting sense, the scope of the present invention being determined by the objects and the claims.

I claim:
1. A vapor generator comprising
    a vertically oriented shell defining a hollow portion in the interior thereof,
    a heat absorbing body having an inwardly depressed concave form disposed within and spaced from said shell defining a fluid region therebetween,
    said fluid region including a peripheral fluid region portion about said heat absorbing body,
    an inner body disposed within said heat absorbing body and defining an interior heating gas chamber therein, and defining thereabout a peripheral heating gas space between said inner cylinder and said heat absorbing body,
    said inner body defining an opening at the top thereof communicating said interior heating gas chamber with said peripheral heating gas space,
    said inner body including a conduit communicating with said fluid region,
    means for passing a vaporizable fluid into said conduit,
    means for providing a heating gas in said interior heating gas chamber at the bottom thereof,
    flue gas exit means communicating with said peripheral fluid region portion for removing said heating gas from said peripheral fluid region portion at the bottom thereof, and
    said inner body disposed within said heat absorbing body closer to said heat absorbing body adjacent said flue gas exit means than at portions remote from said flue gas exit means.
2. The vapor generator, as set forth in claim 1, wherein said heat absorption body comprises pipes.
3. The vapor generator, as set forth in claim 1, wherein said inner body comprises pipes.
4. The vapor generator, as set forth in claim 1, wherein said heat absorption body is formed with uneven surfaces.
5. The vapor generator, as set forth in claim 1, wherein said inner body is formed with uneven surfaces.
6. The vapor generator, as set forth in claim 1, wherein said inner body is formed into a truncated cone.

References Cited
UNITED STATES PATENTS

| | | | |
|---|---|---|---|
| 67,589 | 8/1867 | Rowe | 122—160 |
| 74,269 | 2/1868 | Anderson | 122—160 |
| 826,907 | 7/1906 | Stilwell | 122—160 |
| 1,143,291 | 6/1915 | Lovekin | 122—161 |
| 2,773,488 | 12/1956 | MacCrachen et al. | 122—161 |

KENNETH W. SPRAGUE, *Primary Examiner.*